(12) United States Patent
Wu

(10) Patent No.: US 8,961,195 B2
(45) Date of Patent: Feb. 24, 2015

(54) SOCKET WITH SEVERAL MATING PORTS

(75) Inventor: Jerry Wu, Irvine, CA (US)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 298 days.

(21) Appl. No.: 13/481,932

(22) Filed: May 28, 2012

(65) Prior Publication Data

US 2012/0302104 A1 Nov. 29, 2012

(30) Foreign Application Priority Data

May 27, 2011 (CN) .......................... 2011 1 0140107

(51) Int. Cl.
| | |
|---|---|
| *H01R 24/00* | (2011.01) |
| *H01R 13/6461* | (2011.01) |
| *G02B 6/38* | (2006.01) |
| *H01R 9/03* | (2006.01) |

(52) U.S. Cl.
CPC .......... *H01R 13/6461* (2013.01); *G02B 6/3817* (2013.01); *H01R 9/038* (2013.01)
USPC ..................................... 439/76.1; 439/607.01

(58) Field of Classification Search
USPC ......................................... 439/76.1, 607, 608
See application file for complete search history.

(56) References Cited

U.S. PATENT DOCUMENTS

| | | | |
|---|---|---|---|
| 6,312,294 B1 | 11/2001 | Lai | |
| 7,090,509 B1 * | 8/2006 | Gilliland et al. ............. | 439/76.1 |
| 2002/0009905 A1 * | 1/2002 | Poplawski et al. ........... | 439/76.1 |
| 2008/0214045 A1 * | 9/2008 | Tu et al. ..................... | 439/540.1 |
| 2009/0018682 A1 * | 1/2009 | Fadell et al. ..................... | 700/94 |
| 2010/0062653 A1 * | 3/2010 | Mao et al. ..................... | 439/660 |
| 2010/0068939 A1 * | 3/2010 | Xu et al. ....................... | 439/651 |
| 2011/0111631 A1 * | 5/2011 | Shi et al. ....................... | 439/625 |
| 2011/0151725 A1 * | 6/2011 | Fadell et al. ................. | 439/660 |

* cited by examiner

*Primary Examiner* — Truc Nguyen
(74) *Attorney, Agent, or Firm* — Wei Te Chung; Ming Chieh Chang

(57) ABSTRACT

A cable assembly comprises an insulative, a plurality of contacts received in the insulative housing and a cable extending beyond the insulative housing and electrically connecting with the contacts. The insulative housing has a first mating port, a second mating port and a third mating port located on two opposite sides of the first mating port, respectively. These three ports are insulated with each other. The contacts include a first contact extending into the first mating port, a power contacts extending into the second mating port and a grounding contact extending into the third mating port, by this arrangement, the cable assembly can obtain a well signal transmission quality.

15 Claims, 5 Drawing Sheets

US 8,961,195 B2

SOCKET WITH SEVERAL MATING PORTS

BACKGROUND OF THE INVENTION

1. Field of the Invention

The present invention relates to a socket, especially to a socket adapted for used for high speed signal transmission.

2. Description of the Related Art

Cable assembly is widely used between electronic equipments to transmit signals. A related cable assembly is disclosed in U.S. Pat. No. 6,312,294, which has an insulative housing, a plurality of contacts retained to the insulative housing, a shell covering the insulative housing and a cable connecting with the contacts and extending backwardly beyond the insulative housing. The shell defines a mating port located in front of the insulative housing, the contacts includes a first contact, a grounding contact and a power contact all assigned on a same side of the insulative housing. The grounding contact and the power contact are fixed to an insulating clump assembled to the insulative housing. Each of the first contact, the grounding contact, and the power contact has a contacting portion extending into the mating hole, and it may influences the signal transmission effect of the cable assembly.

Hence, an improved cable assembly is required to overcome the disadvantages of the prior art.

SUMMARY OF THE INVENTION

An object of the invention is to provide a cable assembly which can provide a high transmission quality.

To achieve the above-mentioned object, a cable assembly, comprises an insulative housing, a plurality of contacts received in the insultaive housing, and a cable. The insulative housing defines a first mating port, a second mating port and a third mating port, the second mating port and the third mating port are disposed on two opposite sides of the first mating port, these three mating ports are isolated with each other. The contacts comprises a plurality of first contacts received into the first mating port and a power contact extending into the second mating port and a grounding contact extending into the third mating port. The cable extends beyond the insulative housing and electrically connects with the contacts.

Other features and advantages of the present invention will become more apparent to those skilled in the art upon examination of the following drawings and detailed description of preferred embodiments, in which:

DETAILED DESCRIPTION OF PREFERRED EMBODIMENT

Figure 1:
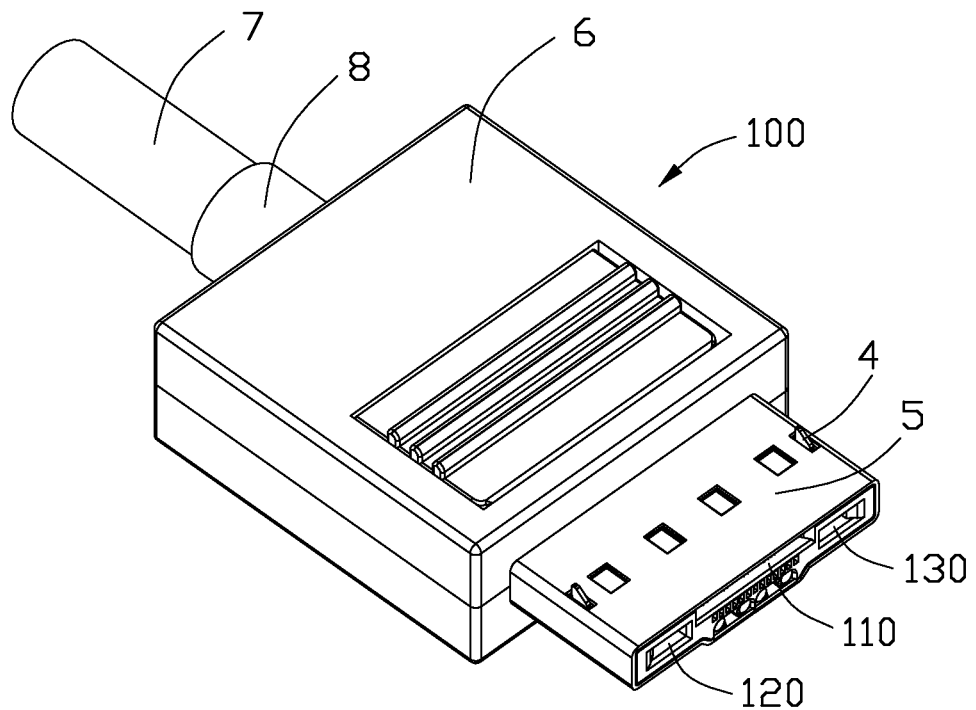
FIG. 1 is an assembled, perspective view of a cable assembly in accordance with a preferred embodiment of present invention.
Figure 2:
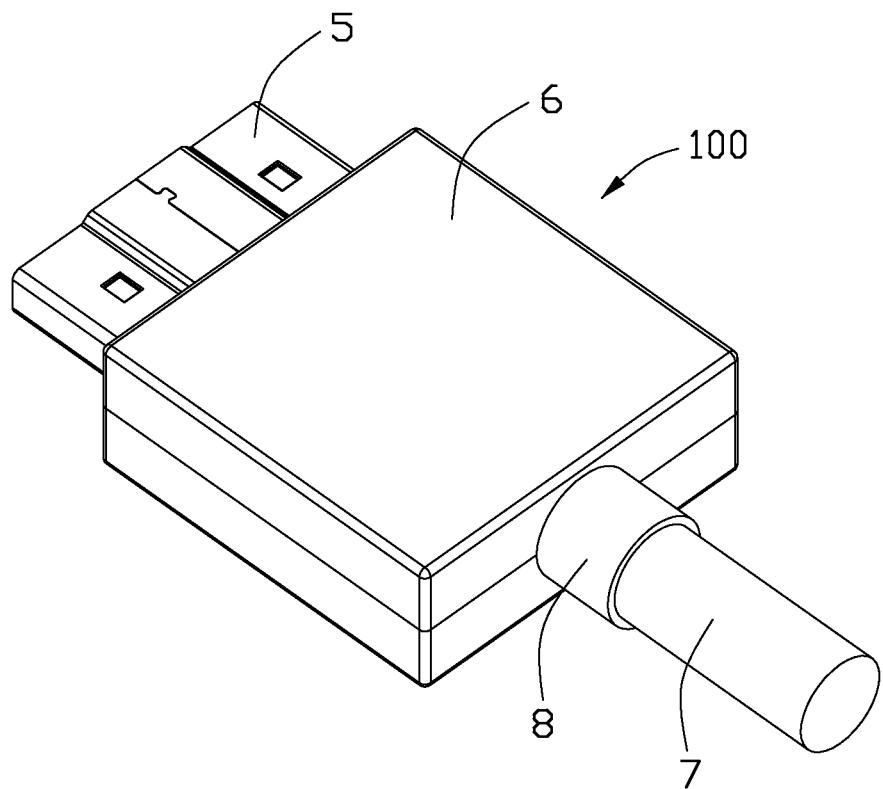
FIG. 2 is similar to FIG. 1, but taken from another side.
Figure 3:
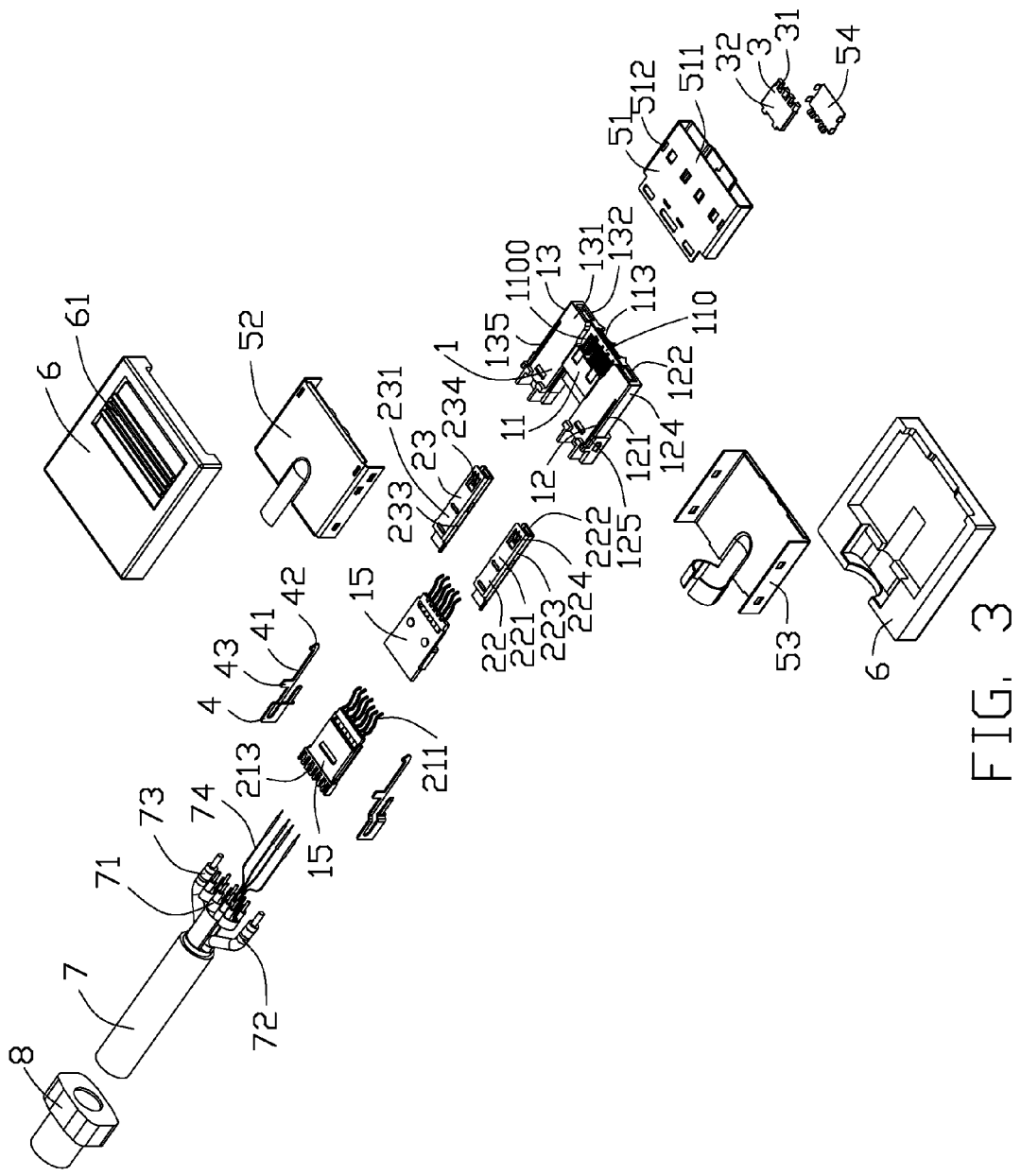
FIG. 3 is an exploded perspective view of the cable assembly.
Figure 4:
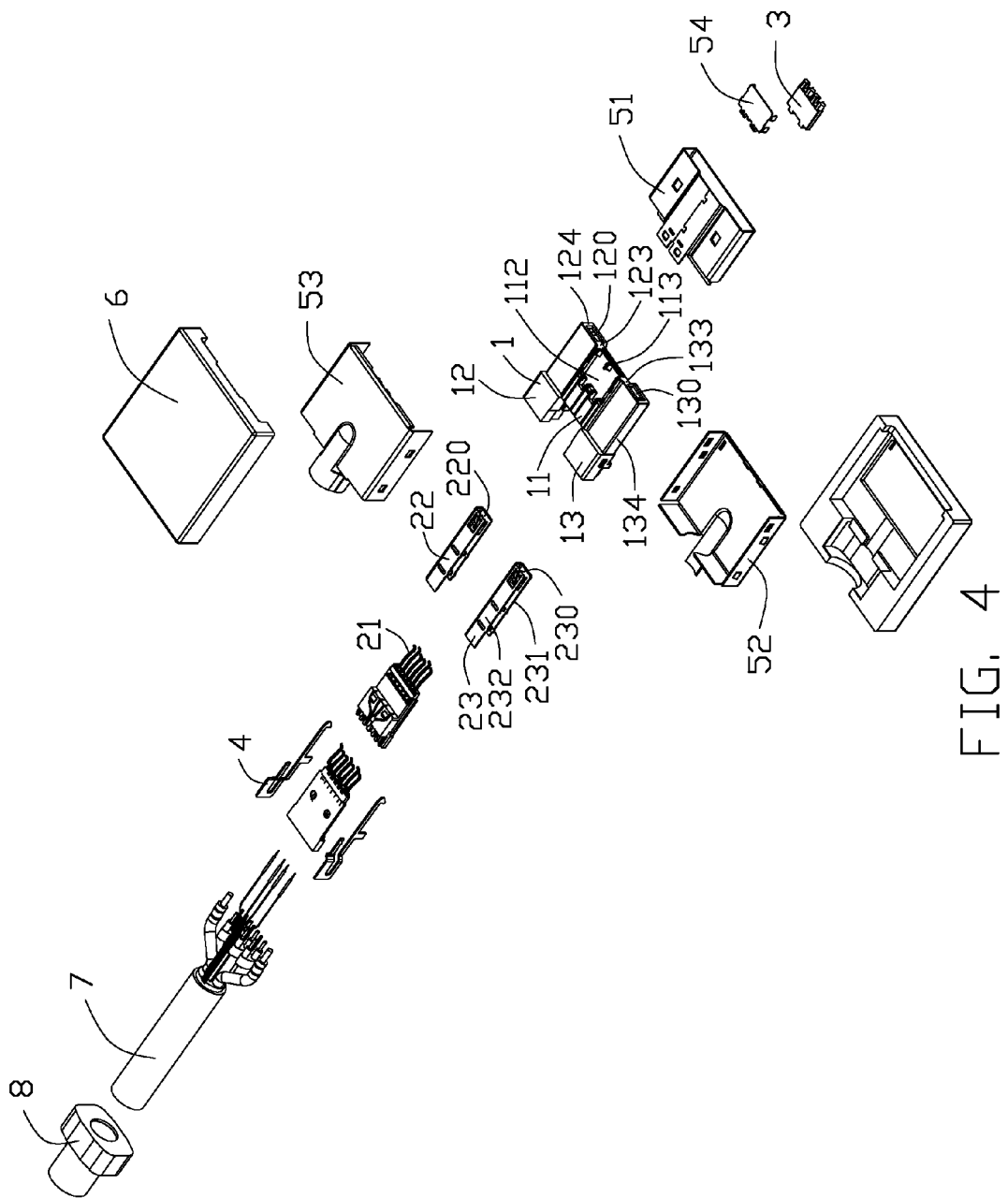
FIG. 4 is a view similar to FIG. 3.
Figure 5:
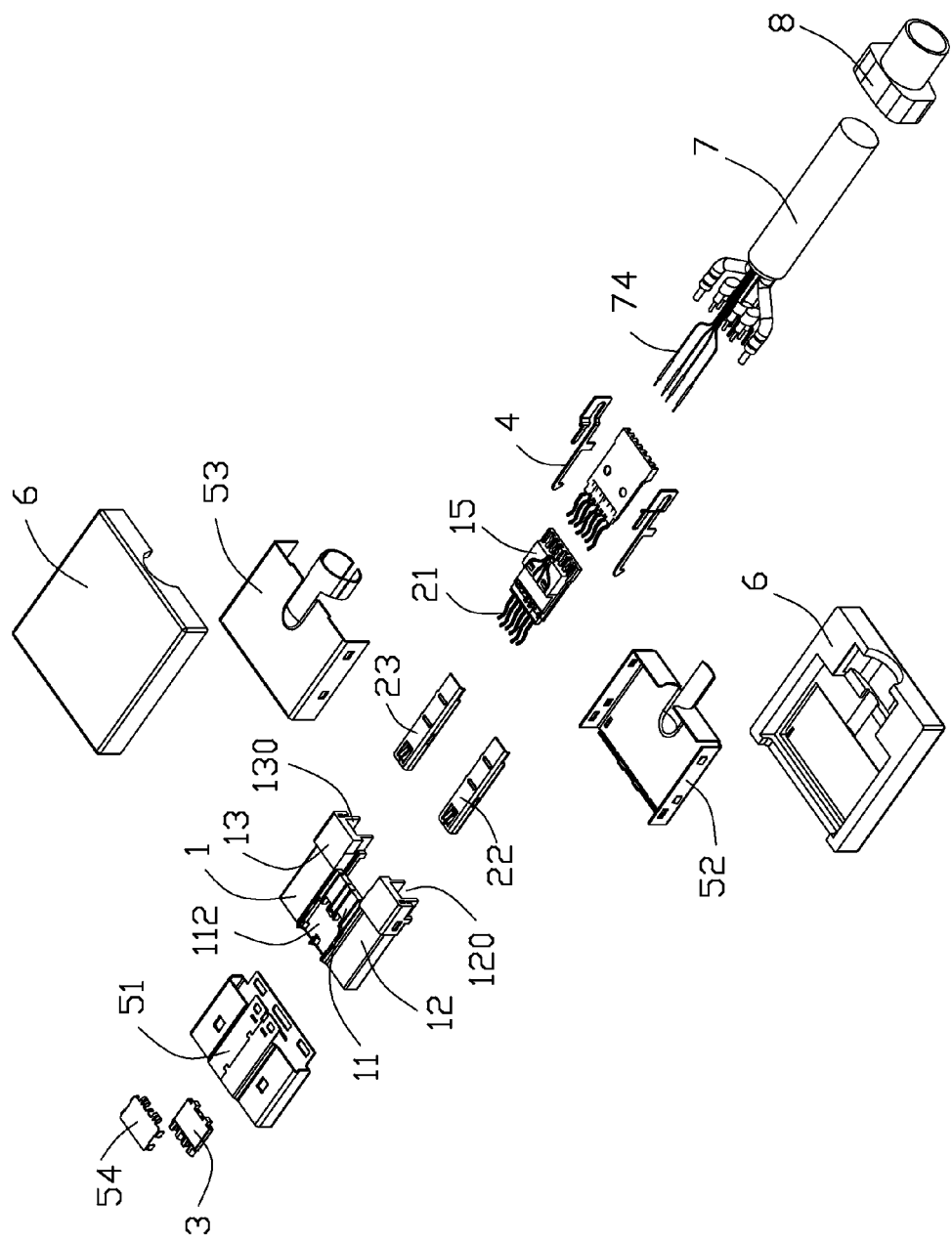
FIG. 5 is another view similar to FIG. 3.

Reference will now be made in detail to the preferred embodiments of the present invention.

The insulative housing has a first body 11, a second body 12 and a third body 13, the second and the third body are symmetrically disposed on two opposite sides of the first body and extend backwardly beyond the first body 11. The first body 11 defines a first mating port 110 and a receiving slot 112 under the first mating port 110 and a middle wall 113 between the first mating port 111 and the receiving slot 112. A plurality of contact passageways 1100 are defined on a bottom wall of the first mating port and arranged along a left-to-right direction.

The second body 12 has a top wall 121, a bottom wall 122, an inner sidewall 123 and an outer sidewall 124 connecting the top wall 121 and the bottom wall 122, a second mating ports 120 is surrounded by the four wall/sidewall 121, 122, 123, 124 and passes through the second body 12 along the front-to-back direction. The third body 13 has a top wall 131, a bottom wall 132, an inner sidewall 133 and an outer sidewall 134 connecting the top wall 131 and the bottom wall 132, a third mating ports 120 is surrounded by the four wall/sidewall 131, 132, 133, 134 and passes through the third body 13 along the front-to-back direction.

The first, the second and the third mating ports 110, 120, 130 are arranged side by side and aligned with each other along a left-to-right direction, the first mating port 110 and the second mating port 130 are isolated with each other by the inner sidewall 123 of the second body 12, the first mating port 110 and the third mating port 130 are isolated with each other by the inner sidewall 133 of the third body 13. So, three mating ports 110, 120, 130 are isolated with each other, without any channel laterally communicating these mating ports 110, 120, 130. Each of the outer sidewalls 124, 134 of the second and the third bodies 12, 13 is formed with a retaining slot 125, 135 on a top thereof to install the latching element 4.

The contacts includes a plurality of first contacts 21, a power contact 22 and a grounding contact 23 located on two opposite sides of the first contacts, to reduce cross-talk influence to the first contacts 21 and improve a signal transmission quality of the cable assembly 100. The first contacts 21 include thirteen contacts which are compliance to Diiva (Digital Interactive Interface for Video & Audio) standard, the first contacts 21 is divided into two groups, and each group insert-molded into an insulating clump 15. So, the first contacts 21 can mate with a diva connector, and the first contacts 21 together with the power contact 22 and the grounding contact 23 engage with another different mating connector (not shown). Two insulting clump 15 are stacked with each other and fixed together, then assembled into the first body 11. The first contacts 21 has a plurality of mating portions 211 arranged in a line and tails 213 exposed outside the insulating clump 15 and connecting with the cable 7. The mating portion 211 is received in the contact passageway 1100 of the first body 11 and upwardly exposed into the first mating port 110 for engaging with a mating connector (not shown).

The power contact 22 and the grounding contact 23 are forwardly assembled to the second and the third mating port 120, 130 of the insulating housing 1, respectively, to connect with the mating connector (not shown). When the mating connector is inserted, the power contact 22 and the ground contact 23 forms a power signal circuit. The power contact 22 has a same configuration with the grounding contact 23, the power contact 22 has an upper wall 221, a below wall 222 opposite to the upper wall 221 and a lateral wall 223 bent downwardly front the upper wall 221 and connecting with the below wall 22, these walls 221, 222, 223 together surround a receiving hole 220. Similarly, the grounding contact 23 has an upper wall 231, a below wall 232, and a lateral wall 233 with same configurations to corresponding parts of the power contact 22, and these walls 231, 232, 233 together surround a receiving hole 230. Each of the upper and the below walls 221, 222, 231, 232 is provided with an elastic arm 224, 234 backwardly and aslant extending into the receiving hole 220, 230, respectively.

The optical member 3 is assembled into the receiving slot 112 of the insulative housing 1 and can slide along the front-to-back direction when mating with the mating connector. The optical member 3 has a plurality of lenses 31 disposed side by side, and an insulative base 32 covering the lenses 31, the cable 7 has a plurality of fibers 74 connecting a rear end of the lens 31 to achieve an optical coupling between the lens 31 and the fiber 74.

The latching element 4 has a latching arm 41 accommodated in the retaining slot 125, 135 of the insulative housing 1, a locking portion 42 upwardly protruding from a front end of the latching arm 41 beyond the cable assembly 100 and a protrusion piece 43 upwardly protruding from the latching arm 41, the protrusion piece 43 is located beside the locking portion 42.

The metal cover 5 includes a first cover 51, a second cover 52, a third cover 53 and an inner cover 54. The first cover 51 has a frame portion 511 directly covering the first, the second and the third bodies 11, 12, 13. The frame portion 511 defines two apertures 512 on two sides of a top wall thereof for the locking portion 42 passing through. The inner cover 54 is fastened to the first body 11 of the insulative housing 1 and directly cover the optical member 3. The second cover 53 and the third cover 53 latch with each other to surround the insulative housing 1, the first cover 51 and the inner cover 54.

The insulative shell 6 is a two-piece element, and enwraps the metal cover 5. The insulative shell 6 has an elastic pressing portion 61 which can float along the a top-to-bottom direction to actuate the protrusion piece 43 of the latching element 4 to make the locking portion 42 protrude out of the cable assembly 100 or hide within the cable assembly 100.

The cable 7 comprises a plurality of first wires 71 connecting with the tails 213 of the first contacts 21, a second wire 72 connecting with a rear end of the power contact 22, a third wire 73 connecting with the grounding contact 323 and the fibers 74 connecting with the lens 31 of the optical member 3. The releasing member 8 is molded on a front end of the cable 7 and received in the insulative shell 6.

While the present invention has been described with reference to preferred embodiments, the description of the invention is illustrative and is not to be construed as limiting the invention. Various of modifications to the present invention can be made to preferred embodiments by those skilled in the art without departing from the true spirit and scope of the invention as defined by the appended claims.

What is claimed is:

1. A cable assembly, comprising:
an insulative housing defining a first mating port, a second mating port and a third mating port, the second mating port and the third mating port disposed on two opposite sides of the first mating port, said three mating ports isolated from one another, the insulative housing having two separated inner sidewall, one inner sidewall insolates the first and the second mating ports, another inner sidewall insolates the first and the third mating ports;
a plurality of contacts received in the insultaive housing, the contacts comprising a plurality of first contacts received into the first mating port and a power contact extending into the second mating port and a grounding contact extending into the third mating port, the power contact and the grounding contact forwardly being assembled to the second and the third mating port; and
a cable extending beyond the insulative housing and electrically connecting with the contacts;
wherein the first mating port define a plurality of contact passageways on a bottom thereof, the first contact has a mating portion received in the contact passageway.

2. The cable assembly as described in claim 1, wherein the first, the second and the third mating ports are arranged side by side, and the first mating port is located in the middle.

3. The cable assembly as described in claim 1, wherein the power contact and the grounding contact form a power signal circuit when the cable assembly engages with a mating connector.

4. The cable assembly as described in claim 1, wherein the insulative housing has a first body, a second body and a third body, the second and the third body are disposed on two opposite sides of the first body, each of the second body and the third body has a top wall, a bottom wall, an inner sidewall and an outer sidewall both connecting the top wall and the bottom wall, the second mating ports is surrounded by the top wall, the bottom wall, the inner sidewall and the outer sidewall of the second body, and the third mating ports is surrounded by the top wall, the bottom wall, the inner sidewall and the outer sidewall of the third body.

5. The cable assembly as described in claim 2, wherein the power contact has an upper wall, a below wall opposite to the upper wall and a lateral wall bent downwardly front the upper wall and connecting with the below wall, the upper wall, the below wall and the lateral wall together define a receiving hole, at least one of the upper wall, the below wall and the lateral wall is formed with a elastic arm extending into the receiving hole.

6. The cable assembly as described in claim 2, wherein the power contact has a same configuration with the grounding contact.

7. The cable assembly as described in claim 6, wherein the first contacts are compliance to Diiva (Digital Interactive Interface for Video & Audio) standard.

8. A cable assembly, comprising:
an insulative housing, the insulative housing having a first mating port, a second mating port and a third mating port, the second mating port and the third mating port being disposed by two opposite sides of the first mating port and being isolated from one another;
a plurality of contacts received in the insultaive housing and extending into the mating port, the contacts comprising a plurality of first contacts, a power contact and a grounding contact, and the first contacts disposed between the power contact and the grounding contact, the first contacts disposed in the first mating port, the power contact extending into the second mating port and the grounding contact extending into the third mating port; and
a cable extending beyond the insulative housing and electrically connecting with the contacts, wherein the first contacts are used for mating with a single mating connector, and the first contacts together with the power contact and the grounding contact engage with another different mating connector.

9. The cable assembly as described in claim 8, wherein the first contacts are compliance to Diiva (Digital Interactive Interface for Video & Audio) standard.

10. A hybrid connector assembly comprising:
an insulative housing defining a primary mating port essentially for electrical signal transmission, with thereof transverse and lengthwise sides perpendicular to each other;

a plurality of small conductive contacts disposed in the housing with contacting sections exposed in the primary mating port;

a pair of secondary mating ports located respectively by the two transverse sides of the primary mating port for power and/or grounding transmission;

a pair of large conductive contacts disposed in the housing with contacting sections exposed in the secondary mating ports, respectively;

a receiving slot located adjacent to the lengthwise side of the primary mating port; and an optical member disposed in the receiving slot for optical signal transmission; wherein said primary mating port is surrounded by said pair of secondary mating port and said optical member.

11. The hybrid connector assembly as claimed in claim 10, further includes a pair of latches located by two sides of the pair of large conductive contacts.

12. The hybrid connector assembly as claimed in claim 11, further including a metallic shell enclosing the housing including the primary mating port, the pair of secondary mating ports and the receiving slot.

13. The hybrid connector assembly as claimed in claim 10, wherein the secondary mating ports are isolated from the primary mating port.

14. The hybrid connector assembly as claimed in claim 13, further including a cable enclosing a plurality of wires respectively electrically connected to the small contacts and large contacts, and a plurality of optical fibers optically connected to the optical member.

15. The hybrid connector assembly as claimed in claim 10, further including an inner cover to hold the optical member in position wherein said inner cover is further equipped with a spring structure to urge the optical member to move forwardly.

* * * * *